United States Patent
Sawada et al.

[11] Patent Number: 5,113,071
[45] Date of Patent: May 12, 1992

[54] ENCODER IN WHICH SINGLE LIGHT SOURCE PROJECTS DUAL BEAMS ONTO GRATING

[75] Inventors: Renshi Sawada, Sayama; Hidenao Tanaka, Tokyo; Osamu Ohguchi, Kawasaki; Junichi Shimada, Iruma, all of Japan

[73] Assignee: Nippon Telegraph & Telephone Corporation, Tokyo, Japan

[21] Appl. No.: 682,144

[22] Filed: Apr. 8, 1991

[30] Foreign Application Priority Data

Apr. 9, 1990 [JP] Japan .................................. 2-93514

[51] Int. Cl.$^5$ .............................................. G01D 5/34
[52] U.S. Cl. ............................ 250/237 G; 250/231.14
[58] Field of Search ................... 250/237 G, 231.14; 341/13

[56] References Cited

U.S. PATENT DOCUMENTS

| | | |
|---|---|---|
| 3,818,274 | 6/1974 | DeWitte et al. |
| 4,536,649 | 8/1985 | Kozai et al. ................... 250/231.16 |
| 4,549,300 | 10/1985 | Mitsuhashi et al. |
| 4,868,385 | 9/1989 | Nishimura. |
| 4,883,955 | 11/1989 | Kawasaki et al. |
| 4,899,048 | 2/1990 | Shelander. |
| 4,955,718 | 9/1990 | Michel. |
| 5,000,542 | 3/1991 | Nishimura et al. ............. 250/237 G |
| 5,003,600 | 3/1991 | Deason et al. ................. 250/237 G |

FOREIGN PATENT DOCUMENTS

| | | |
|---|---|---|
| 0276395 | 8/1977 | European Pat. Off. |
| 2308643 | 8/1973 | Fed. Rep. of Germany. |
| 2431166 | 1/1975 | Fed. Rep. of Germany. |

Primary Examiner—David C. Nelms
Assistant Examiner—K. Shami
Attorney, Agent, or Firm—Frishauf, Holtz, Goodman & Woodward

[57] ABSTRACT

An encoder includes a semiconductor laser capable of emitting two coherent light beams from two end faces thereof, respectively. The end faces of the semiconductor laser are arranged such that the coherent light beams intersect each other. The two coherent light beams emitted from the end faces of the semiconductor laser are incident on a scale having a plurality of gratings. The two coherent light beams are diffracted by the gratings, resulting in two diffracted light beams. The two diffracted light beams interfere with each other, and the intensity of the resultant interference light beam is detected by a detector. In response to this detection, the detector produces a signal corresponding to the intensity change which is proportional to the relative moving distance between the detector and the scale.

5 Claims, 4 Drawing Sheets

ENCODER IN WHICH SINGLE LIGHT SOURCE PROJECTS DUAL BEAMS ONTO GRATING

BACKGROUND OF THE INVENTION

1. Field of the Invention

The present invention relates to improvement of an encoder which utilizes coherent light.

2. Description of the Related Art

FIG. 1 shows a conventional encoder which utilizes coherent light. This encoder is comprised of a main body 7 and a scale 9. The main body 7 incorporates a semiconductor laser 1 (which has one light beam-output terminal), a lens 2, a half mirror 3, reflecting mirrors 4 and 5, and photodetector 6. The scale 9 is provided with a large number of gratings 8. A typical example of such an encoder is disclosed in U.S. Pat. Nos. 4,868,385 4,883,955 and 4,899,048.

A light beam 10 output from the output terminal of the semiconductor laser 1 is converged by the lens 2, and is then divided into two light beams 11 and 12 by the half mirror 3. Light beams 11 and 12 are reflected by reflecting mirrors 4 and 5, respectively, such that the reflected light beams intersect each other. Thereafter, the light beams 11 and 12 are incident on the scale 9. The light beams 11 and 12 are diffracted by the gratings 8, and therefore become diffracted light beams 13 and 14, respectively. These diffracted light beams 13 and 14 interfere with each other, and become a coherent light beam. This coherent light beam is incident on the photodetector 6, for measurement of the beam intensity.

Either the main body 7 or the scale 9 is attached to a given movable object (not shown). When the object moves, the intensity of the coherent beam changes in proportion to the distance for which the object moves. Thus, the photodetector 6 produces a signal which changes in proportion to that distance. This being so, the encoder can be used as a sensor which is to be incorporated in a micro machine.

In the above encoder, the light beam is output from only one end of the semiconductor laser 1. Due to this structure, not only the semiconductor laser 1 and the photodetector 6 but also the lens 2, the half mirror 3 and the reflecting mirrors 4 and 5 have to be positioned and fixed with high accuracy. The encoder incorporating all these structural components is inevitably large in size. In addition, it takes time to position the optical components. Further, since the accuracy with which the structural components are positioned is likely to be degraded by external vibration, the encoder does not always ensure high measurement accuracy.

SUMMARY OF THE INVENTION

Accordingly, an object of the present invention is to provide an encoder which is free from the above problems, i.e., an encoder which requires neither a half mirror nor reflecting mirrors and is therefore small in size, which lessens or eliminates the difficulty in positioning, and which operates reliably regardless of external vibration and ensures high measurement accuracy.

To achieve this object, the present invention provides an encoder which comprises:

semiconductor laser means for emitting two coherent light beams from two end faces thereof, the end faces being arranged such that the two coherent light beams intersect each other;

scale means, having a plurality of gratings, for diffracting the two coherent light beams emitted from the end faces of the semiconductor laser and for causing interference between diffracted light beams, to thereby obtain an interference light beam; and detector means for receiving the interference light beam and detecting an intensity change of the interference light beam, the detector means outputting a signal corresponding to the intensity change which is proportional to the relative moving distance between the detector means and the scale means.

With the above structure, the encoder of the present invention operates as follows. The semiconductor laser emits two coherent light beams from its two end faces, respectively. The coherent light beams intersect each other, due to the arrangement of the end faces, and are then incident on the scale. The coherent light beams are diffracted by the gratings of the scale, thus producing two diffracted light beams. The two diffracted light beams interfere with each other, resulting in an interference light beam. The intensity of this interference light beam is detected by the photodetector.

The conventional encoder mentioned above has to employ a half mirror and reflecting mirrors since the semiconductor laser of the encoder emits a light beam from only one end face thereof. The need to employ such structural components has been eliminated by the encoder of the present invention since the semiconductor laser employed in this encoder emits two coherent light beams from the respective end faces. Accordingly, the size of the encoder of the present invention can be reduced. In the encoder of the present invention, moreover, the semiconductor laser and the photodetector are arranged on the same substrate. Accordingly, positioning is not necessary. In addition, the encoder operates reliably regardless of external vibration and provides high measurement accuracy.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1:
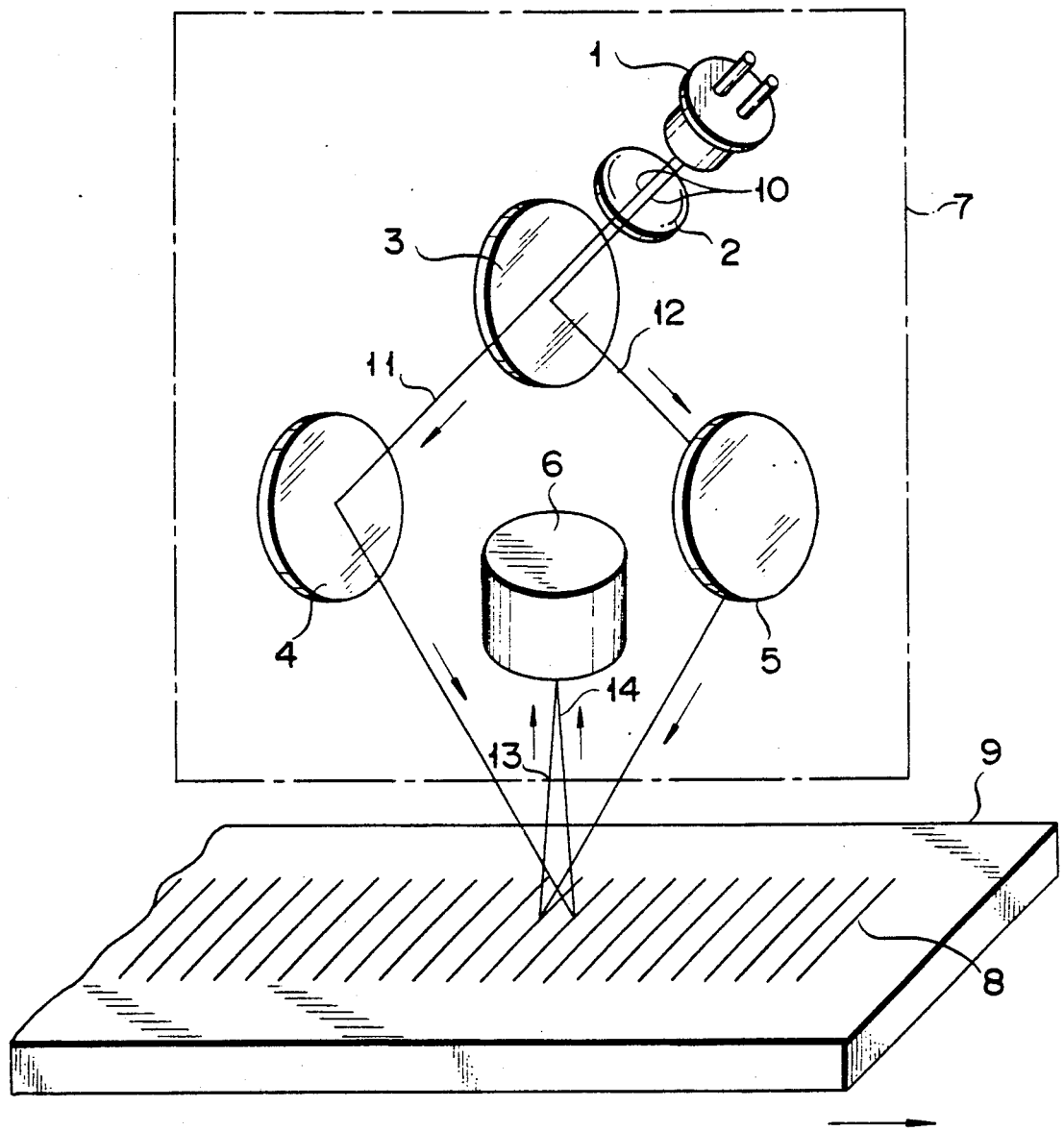
FIG. 1 is a schematic view showing the structure of a conventional encoder.
Figure 2:
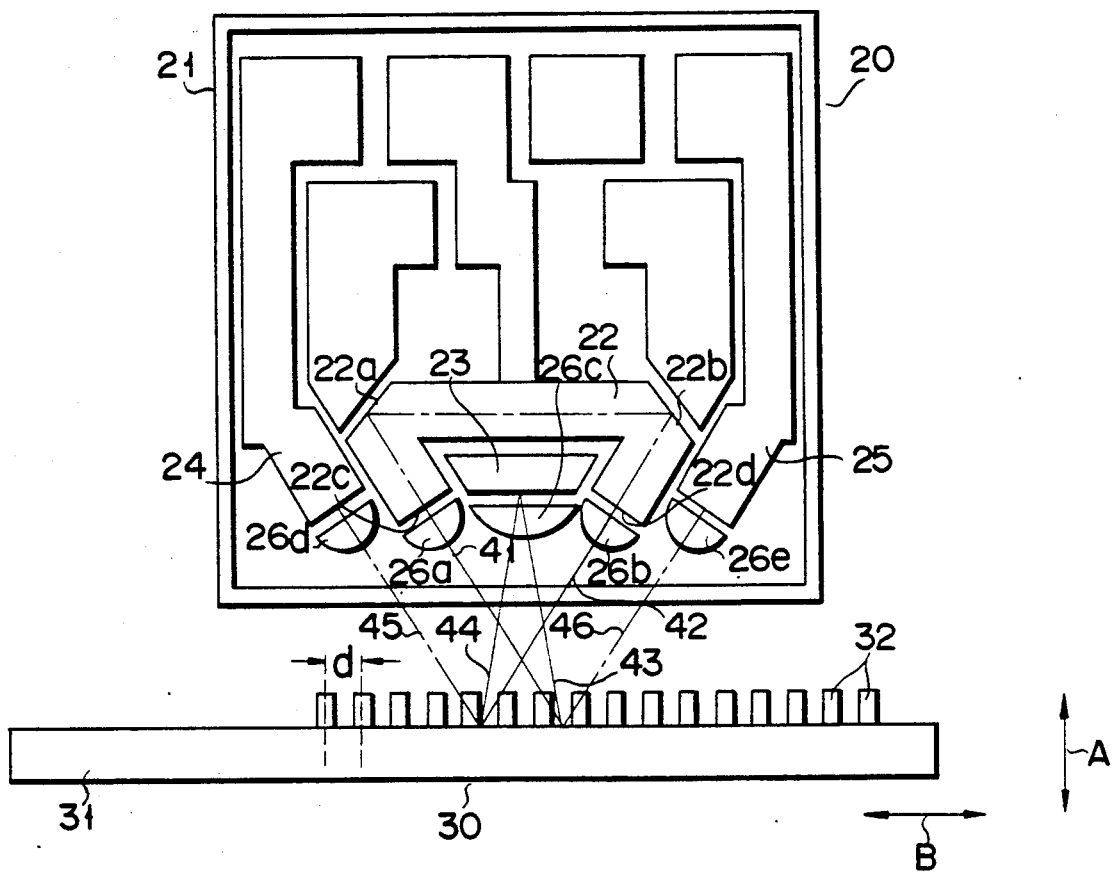
FIG. 2 is a schematic view showing the structure of an encoder according to the first embodiment of the present invention.

FIG. 2 shows an encoder according to the first embodiment of the present invention. In FIG. 2, reference numerals 20 and 30 denote the main body and scale of the encoder, respectively.

The main body 20 is made up of a single substrate 21, a semiconductor laser 22 integrally formed with the substrate 21, a photodiode 23 (which serves as a photodetector), monitoring photodiodes 24 and 25, and lenses 26a, 26b, 26c, 26d and 26e.

The semiconductor laser 22 is bent at two points, and two total-reflecting surfaces 22a and 22b are formed at these two points, respectively. The semiconductor laser 22 is bent such that optical axes 41 and 42 passing through the centers of the end faces 22c and 22d (from which a light beam is emitted) intersect each other. Photodiode 23 is arranged between the two end faces 22c and 22d of the semiconductor laser 22 such that it is located in a plane where light beams diffracted by the scale 30 intersect each other. In other words, the scale 30 is positioned in the direction of arrow A such that it diffracts the two light beams emitted from the end faces 22c and 22d and such that it allows the diffracted light beams to be incident on the photodiode 23. Photodiodes 24 and 25 are arranged on the outer sides of the two end faces 22c and 22d of the semiconductor laser 22 such that they receive light components 45 and 46 which are emitted by the end faces 22c and 22d and which are reflected by the scale 30. Lens 26a and 26b are located in the vicinity of end faces 22c and 22d, respectively, and lenses 26c, 26d and 26e are located in the vicinity of photodiodes 23, 24 and 25, respectively.

The scale 30 is made up of a single substrate 31, and a large number of gratings 32 formed on the substrate 21 at pitch d. A reflecting film, formed of a metallic material such as aluminum, gold, or chromium, is formed on that side of the substrate 31 on which the gratings 32 are arranged. The gratings 32 are also covered with that reflecting film.

Figure 3:
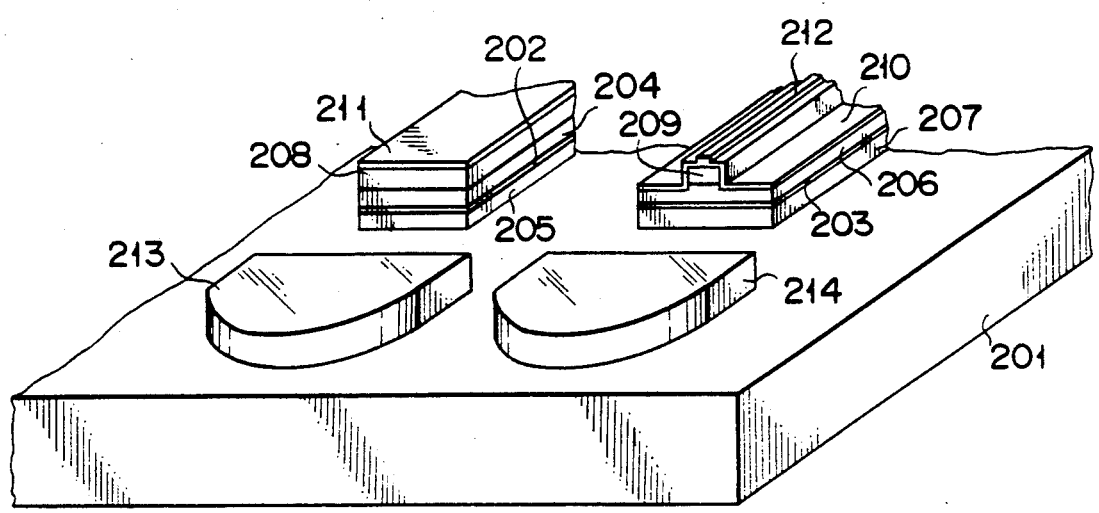
FIG. 3 is a perspective view of the major portion of the encoder of the first embodiment and illustrates the state where the structural components of the encoder are integrally formed with a substrate.

The semiconductor laser 22 and photodiodes 23-25 mentioned above are fabricated, for example in the manner shown in FIG. 3. As is shown in FIG. 3, a single substrate 201 is overlaid with active layers 202 and 203 and with clads 204, 205, 206 and 207. The active layers and the clad are formed by crystal growth. Further, cap layers 208 and 209, an insulating layer 210, and electrodes 211 and 212 are formed by deposition and etching. On the other hand, the lenses 26a-26e are formed by the steps of: covering the above structural elements with resist; depositing a glass material over the resist by sputtering or the like; forming a lens-shaped resist pattern by photolithography; and etching the glass material, with the lens-shaped resist pattern as a mask. As a result of these steps, lenses 213 and 214 ar formed in the vicinity of the end faces of the semiconductor laser and photodiodes. In the above fabrication method of the lenses, the step of depositing the glass material may be replaced by a step of forming a layer of the same material as the semiconductor laser by crystal growth.

The light beams 41 and 42 emitted from the end faces 22c and 22d of the semiconductor laser 22 are first converged by lenses 26a and 26b, respectively, and are then incident on the scale 30 after intersecting each other. The light beams 41 and 42 incident on the scale 30 are diffracted by the gratings 32, thereby producing diffracted light beams 43 and 44. After passing through lens 26c, the diffracted light beams 43 and 44 interfere with each other. An interference light beam, produced by this interference, falls on photodiode 23, by which the intensity of the interference light beam is detected.

Photodiode 23 produces a current which varies in proportion to the intensity of the interference light beam. Since the intensity of the interference light beam varies in proportion to the distance for which the main body 20 and the scale 30 move relative to each other in the direction indicated by arrow B, the current produced from photodiode 23 also varies in proportion to that moving distance. Therefore, by providing either the main body 20 or the scale 30 for a given movable supporting member, the distance for which the supporting member moves in the direction of arrow B can be derived from the value of the current produced from the photodiode 23.

Figure 4:
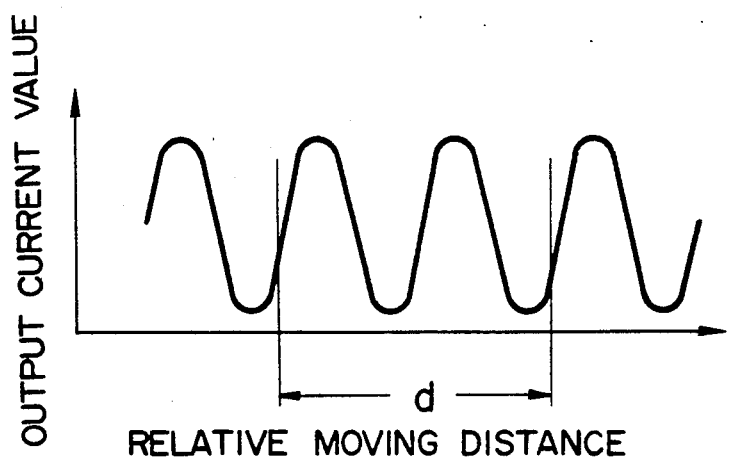
FIG. 4 is a graph showing how an output current is related to the relative moving distance between the scale and the photodetector of the encoder of the first embodiment.

FIG. 4 is a graph showing the relationships between the moving distance and the value of the current produced by the photodiode 23. As is shown in FIG. 4, the current produced by the photodiode 23 changes such that two wave cycles of a sinusoidal wave correspond to the moving distance d which is equal to one pitch of the gratings 32. Therefore, the moving distance can be measured with the accuracy corresponding to ¼ of the pitch of the gratings 32, by counting the number of upper and lower points (namely, ridges and troughs) of the sinusoidal wave. The measuring accuracy (i.e., resolution) can be improved by division of the current value. Let it be assumed that V denotes the resolution, N denotes the number of divisions of one wave cycle of a sinusoidal wave, and n denotes the number of times at which diffraction occurs. In this case, the following equation is obtained:

$$V = d/2 \cdot N \cdot n \qquad (1)$$

In the case where n=1, as in the above embodiment, the resolution V will correspond to 0.02 $\mu$m if the number N of divisions is 40 and the moving distance d is 1.6 $\mu$m.

In the meantime, the following relationship is known between the angle $\theta_0$ of incidence and the angle $\theta_1$ of diffraction:

$$\sin\theta_0 + \sin\theta_1 \lambda/d \qquad (2)$$

where $\lambda$ is the wavelength of a light beam emitted from the laser.

Photodiode 24 detects the reflected component 45 of light beam 42, and produces a current corresponding to the intensity of the reflected component 45. Likewise, photodiode 25 detects the reflected component 46 of light beam 41, and produces a current corresponding to the intensity of the reflected component 46. The intensities of the reflected components 45 and 46 vary in accordance with the distance by which the main body 20 and the scale 30 are spaced from each other in the direction of arrow A. In the present invention, the diffracted light beam is made to incident on photodiode 23 in an optimal manner when the intensities of the reflected components 45 and 46 are maximum, and the position of the main body 20 or scale 30 are controlled by e.g., a positioner (not shown) such that the intensity of the reflected components 45 and 46 become maximum. Photodiodes 24 and 25 do not detect reflected light beam components if the intensity level of the light beam emitted from the semiconductor laser 22 is too low or if the scale 30 is not at the predetermined position. Thus, photodiodes 24 and 25 each serve as a monitor.

In the above embodiment, the semiconductor laser, the photodiodes and the lenses are integrally formed on the same substrate. With this structure, it is not necessary to position, adhere or fix each structural component. In addition, each structural component is prevented from being displaced from the original position even if external vibration is applied to it. Further, the encoder can be very small since the two light beams emitted from the respective end faces of the semiconductor laser are used as two coherent light beams without being subjected to any special processing.

Figure 5:
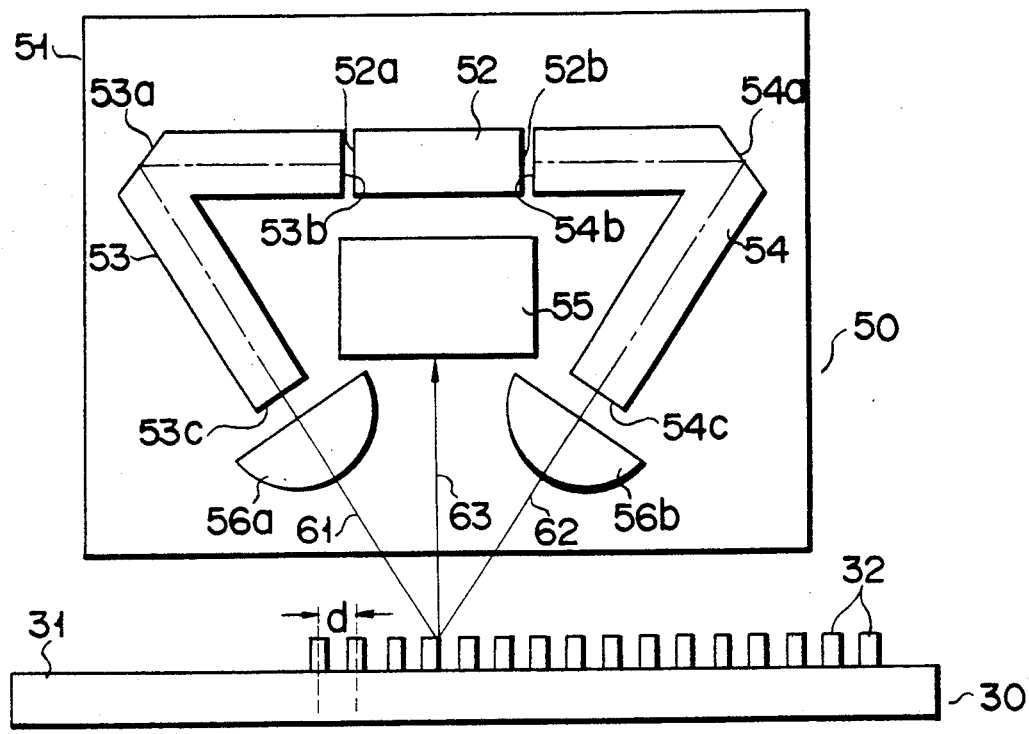
FIG. 5 is a schematic view showing the structure of an encoder according to the second embodiment of the present invention.

FIG. 5 shows the structure of an encoder according to the second embodiment of the present invention. In the encoder of the second embodiment, a linear semiconductor laser is employed. In FIG. 5, reference numeral 50 denotes the main body of the encoder, and this main body 50 is made up of a single substrate 51, a semiconductor laser 52, light wave directors 53 and 54, a photodiode 55, and lenses 56a and 56b. The semiconductor laser 52, the light wave directors 53 and 54, the photodiode 55 and the lenses 56a and 56b are integrally formed with the single substrate 51. Light wave director 53 has a totally-reflecting surface 53a therein, and its first end face 53b faces one end face 52a of the semiconductor laser 52. Likewise, light wave director 54 has a totally-reflecting surface 54a therein, and its first end face 54b faces the other end face 52b of the semiconductor laser 52. The light wave directors 53 and 54 are bent such that the optical axes passing through the centers of their second end faces 53c and 54c intersect each other at a predetermined point. Photodiode 55 is located between the second end faces 53c and 54c of the light wave directors 53 and 54. The position of photodiode 55 is arranged so that light beams, which are output from the second end faces 53c and 54c, are diffracted by the scale 30 and intersect each other. Lenses 56a and 56b are located in the vicinity of the second end faces 53c and 54c of the light wave directors 53 and 54, respectively. In the encoder of the second embodiment, no lens is arranged in front of the light-receiving surface of the photodiode 55 since this photodiode 55 is thick enough to eliminate the need to employ such a lens.

The light beams emitted from the end faces 52a and 52b of the semiconductor laser 52 enter the light wave directors 53 and 54 through the first end faces 53b and 54b, respectively. After being changed in traveling direction, the light beams are output from the light wave directors 53 and 54 through the second end faces 53c and 54c, respectively. The light beams 61 and 62 output from the second end faces 53c and 54c are converged by the lenses 56a and 56b, respectively, and are thereafter incident on the scale 30. The light beams 61 and 62 incident on the scale 30 are diffracted by the gratings 32, thereby producing diffracted light beams 63. The diffracted light beams interfere with each other, and an interference light beam, produced by the interference, falls on the photodiode 55. By this photodiode 55, the intensity of the interference light beam is detected.

In the encoder of the second embodiment, the semiconductor laser is linear; it need not have a special shape, differing from the first embodiment, because the light beams emitted from the two end faces of the linear semiconductor laser are guided by the light wave directors. In addition, the use of the linear semiconductor laser ensures easy fabrication of the encoder. As for the other structures and advantages, the second embodiment is substantially similar to the first embodiment.

In the second embodiment, the light wave directors may be constituted by optical fibers. Where optical fibers are employed, the semiconductor laser and the photodetector can be designed with a comparatively high degree of freedom.

Figure 6:
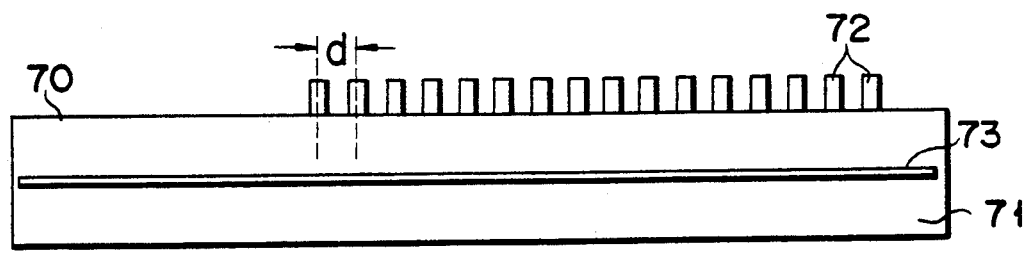
FIG. 6 is a side view of a modification of the scale employed in the present invention.

FIG. 6 shows a modification of the scale employed in the present invention. According to this modification, the gratings of the scale are formed of a material allowing light transmission, and a reflecting film is formed under the gratings.

In FIG. 6, reference numeral 70 denotes a scale. This scale 70 is made up of a single substrate 71, a large number of gratings 72 formed on the substrate 71 at pitch d, and a reflecting film 73 (such as a metallic film) formed inside the substrate 71. The substrate 71 and the gratings 72 are formed of a material allowing light transmission; for example, they are formed of $SiO_2$. The scale 70 can be fabricated by the steps of: depositing a metallic material over a substrate by sputtering or the like; depositing $SiO_2$ over the resultant structure; forming a resist pattern corresponding to gratings by photolithography; and carrying out etching.

The scale 70 mentioned above operates as follows. Light beams are guided to the scale 70 from the main body of the encoder. The light beams are transmitted through the gratings 72 while being diffracted thereby. Then, the diffracted light beams are reflected by the reflecting film 73, and are diffracted again by the gratings 72. Thereafter, the diffracted light beams are returned to the main body of the encoder. Since, as mentioned above, the resolution is improved in proportion to the number of times at which diffraction occurs, the scale 70 ensures resolution which is twice as high as that of the scale 30 which was described above with reference to the first and second embodiments.

The scale 70 can be employed in the first and second embodiments, replacing the scale 30. Moreover, the scale 70 may be employed in a conventional encoder, so as to improve the resolution.

The efficiency and other characteristics of gratings are detailed in Kiyoshi Yokomori, "Dielectric surface-relief gratings with high diffraction", Applied Optics, Vol. 23, No. 14 (1983), 2303. In this document, it is stated that the efficiency at which diffracted light is produced from incident light is 70% or more if diffraction gratings are formed by regularly-arranged deep grooves and if light is incident on the diffraction gratings at an angle nearly equal to Bragg diffraction angle $\theta_B$ ($=\sin(\lambda/2d)$). For example, in the case where the wavelength of the incident light is 0.83 $\mu$m, the efficiency becomes highest by setting the pitch of the gratings to be 1.6 $\mu$m. In this case, the electric signal produced by the photodiode changes such that one wave cycle of a sinusoidal wave corresponds to a moving distance of 0.8 $\mu$m (which is ½ of 1.6 $\mu$m). Therefore, it is possible to provide an encoder which ensures high resolution and high efficiency, by employing the above-mentioned scale 70 and causing diffraction at an angle nearly equal to the Bragg diffraction angle.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An encoder comprising:
   semiconductor laser means for emitting two coherent light beams from two end faces thereof, said end faces being arranged such that the two coherent light beams intersect each other;
   scale means, having a plurality of gratings, for diffracting the two coherent light beams emitted from the end faces of the semiconductor laser and for causing interference between diffracted light beams, to thereby obtain an interference light beam; and
   detector means for receiving the interference light beam and detecting an intensity change of the interference light beam, said detector means outputting a signal corresponding to the intensity change which is proportional to a relative moving distance between the detector means and the scale means.

2. An encoder according to claim 1, wherein said semiconductor laser means includes: a linear semiconductor laser element; and a pair of light wave directors each having a beam-incident end face which is opposed to a beam-emitting end face of the semiconductor laser element and which receives the coherent light beam, each of said light wave directors having a bent section where a totally-reflecting surface is formed, and being arranged such that the coherent light beams intersect each other.

3. An encoder according to any one of claims 1 and 2, wherein said semiconductor laser means and said detector means are integrally formed with a single substrate.

4. An encoder according to claim 2, wherein each of said light wave directors includes an optical fiber.

5. An encoder according to claim 1, wherein: said scale means includes a reflecting film which reflects a diffracted light beam transmitted through the gratings and diffracted thereby, back to the gratings; and
   said gratings are formed of a material allowing a light beam to be transmitted therethrough.

* * * * *